May 21, 1968     J. C. JEANNETTE     3,384,778
TOUCH STARTING OF POWER ARCS WITH CONSUMABLE ELECTRODE
Filed Dec. 31, 1964     3 Sheets-Sheet 1

INVENTOR
JOSEPH C. JEANNETTE
BY
AGENT

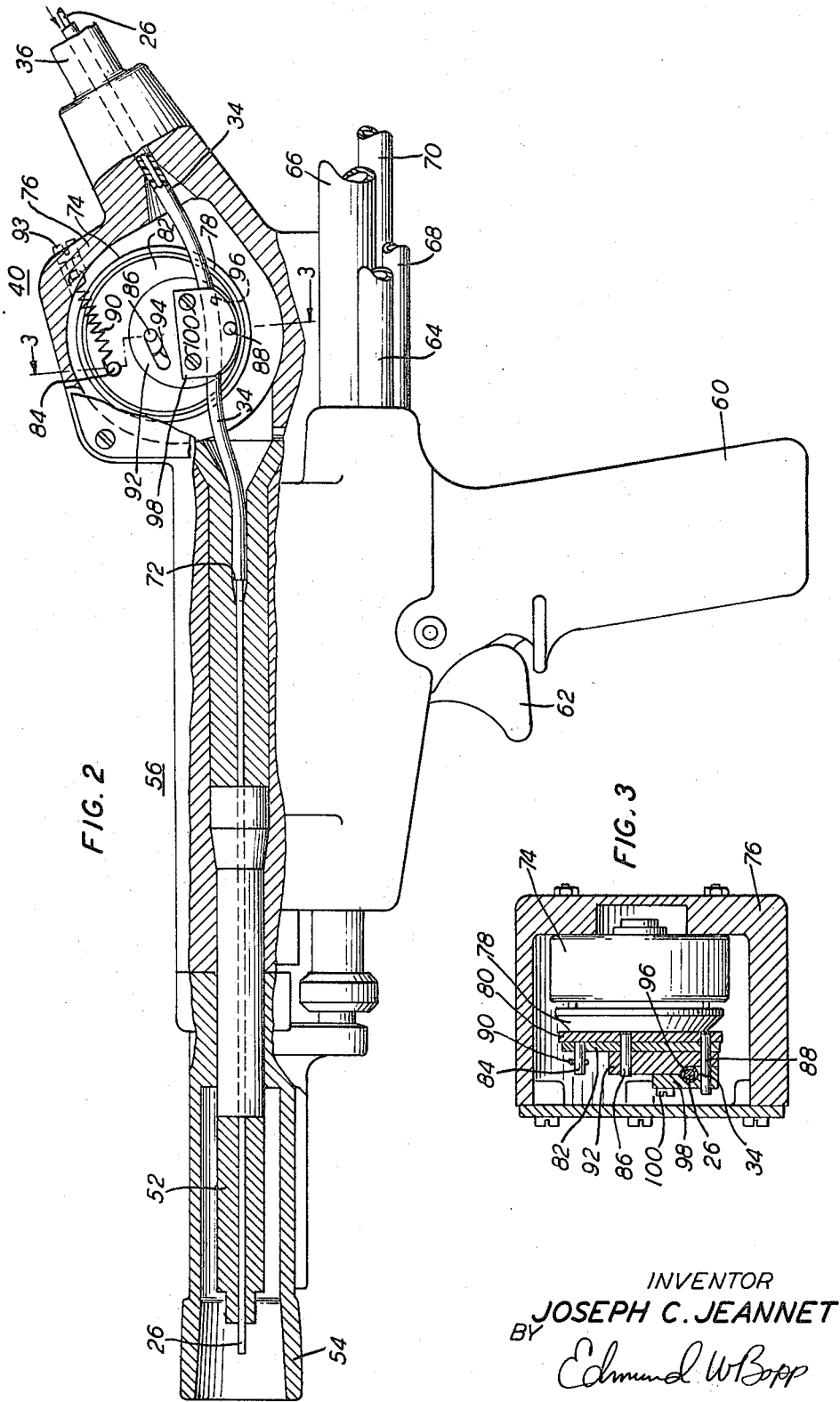

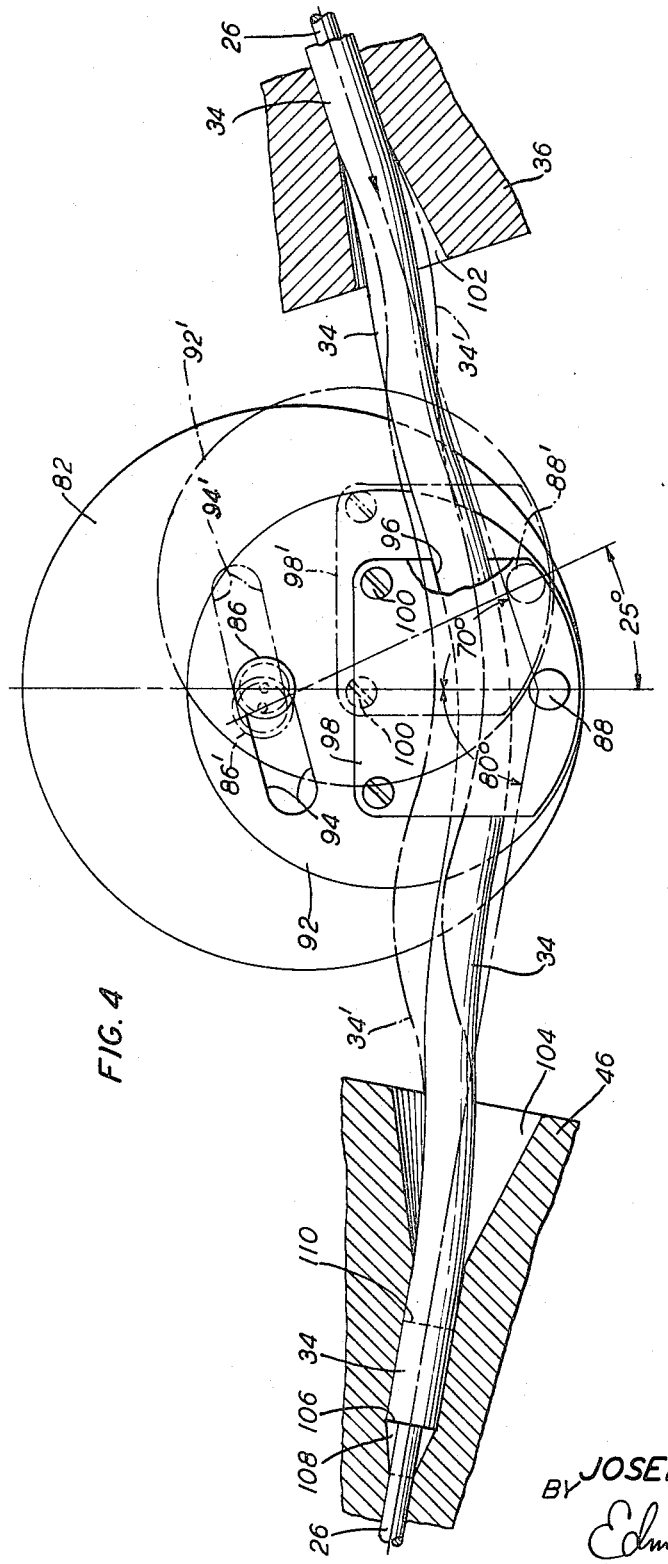

United States Patent Office 3,384,778
Patented May 21, 1968

3,384,778
TOUCH STARTING OF POWER ARCS WITH
CONSUMABLE ELECTRODE
Joseph C. Jeannette, Union, N.J., assignor to Air Reduction Company, Incorporated, New York, N.Y., a corporation of New York
Filed Dec. 31, 1964, Ser. No. 422,629
12 Claims. (Cl. 314—68)

The invention described herein was made in the performance of work under a NASA contract and is subject to the provisions of Section 305 of the National Aeronautics and Space Act of 1958, Public Law 85-568 (72 Stat. 435; 42 USA 2457).

My invention relates to the starting of power arcs by drawing apart two touching electrodes between which current is passing, one of which electrodes is continuously consumed in the power arc during a welding operation and for that reason is advanced into the arc at a sufficiently rapid rate after the arc had been started, to supply the metal to be deposited by the arc and to prevent the arc from being extinguished by becoming unduly lengthened.

In accordance with the invention, I feed a sufficiently stiff welding wire electrode to the arc through a curved channel in a rigid guide member. At the start, the tip of the wire electrode is not in contact with a workpiece to be welded, but the wire is propelled toward the workpiece at a linear speed which is preferably less than the speed at which it is desired to feed the wire into the arc during the welding operation. When the wire touches the workpiece, a current is set up from the welding power source through the contact between the wire electrode and the workpiece. This current is employed to actuate a driving member which is attached to the guide member to retract this member rapidly through a short distance. The stiff electrode wire is driven through the curved guide channel at a lower linear speed than the speed at which the guide member is being retracted, with the result that there is a net retraction of the tip of the wire electrode from the workpiece after the contact is made. Upon the separation of the wire electrode and the workpiece, the power arc is established in a known manner. Preferably at the same instant that contact is made, the current through the contact is further employed to actuate means to speed up the electrode wire feed mechanism rapidly to the desired full linear speed required in the welding operation. In known manner, a steady state is soon reached in which the arc length remains substantially constant, the wire melting away in the arc at the same linear rate as the wire is fed into the arc.

The rigid guide member when moved tends to carry the relatively stiff wire along with it, thus causing the desired retraction of the wire from the workpiece. The amount of retraction required is relatively slight, being in one embodiment three-sixteenths of an inch. This amount of backed up wire is readily accommodated between the guide member and the usual wire feed rolls by a slight flexing of the wire in this region.

For reasons having to do with ruggedness of construction, overall size, and geometrical configuration, I find it advantageous to employ as the mechanism for moving the guide member a relay of the type commonly known as a rotary solenoid, and I provide a linkage between the rotary armature of the solenoid and the guide member by means of which the curved channel is moved in the plane of its curvature in a substantially pure translatory motion without a material rotary motion. In this way, the translatory motion of a piston driven by a straight solenoid is approximately in a relatively small amount of space.

An object of the invention is to simplify and reduce the cost of apparatus for touch starting of a power arc using a consumable electrode.

Another object is to reduce the space requirement of such a device, particularly when embodied in a hand held welding gun.

Another object is to reduce the weight of such a device for hand use.

A further object is to improve the art of spot welding by making successive spot welds substantially duplicate in nature, so that the size of the weld and the degree of penetration of the weld into the material of the workpiece are almost exactly the same from one weld to the next in a workpiece of a given material.

Other features, objects and advantages will appear from the following more detailed description of an illustrative embodiment of the invention, which will now be given in conjunction with the accompanying drawings.

In the drawings,

FIGURE 2 is an elevational view, partly in section and partly broken away, showing an embodiment of the invention in a hand held electric arc welding gun with pistol grip type of handle;

Figure 1:
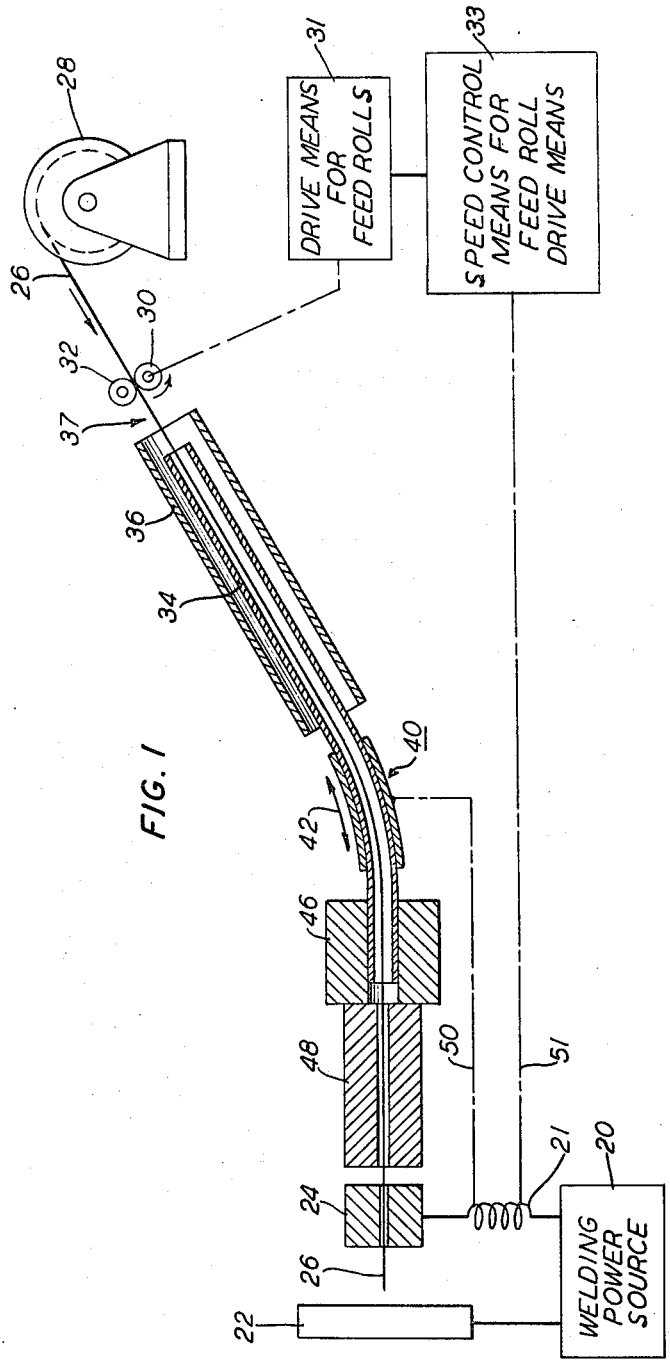
FIGURE 1 is a schematic diagram illustrating the salient features of the invention.

FIGURE 3 is a sectional view of a wire retracting device employing a rotary solenoid as embodied in the arrangement of FIGURE 2, and viewed along the line 3—3 in FIGURE 2; and FIGURE 4 is an enlarged diagrammatic representation of a portion of the arrangement of FIGURES 2 and 3, showing retracted and unretracted positions of parts rotated by the rotary solenoid and of a casing liner for a welding wire which wire is retracted by means of the rotary solenoid.

Referring first to FIGURE 1, the principle of the invention is illustrated by a schematic diagram, in which a welding power source 20 is shown having one of its terminals connected to a workpiece 22 and the other terminal connected through a relay winding 21 and a contact shoe 24 to a consumable welding electrode 26 which is in the form of a wire. A supply of welding wire for the welding operation is stored on a reel 28 and is pulled from the reel by a pair of feed rolls 30, 32, of which at least one, for example roll 30, is power driven by feed roll drive means shown schematically in block form at 31, in counterclockwise direction as indicated, to feed the wire from right to left in the figure. From the rolls, the wire 26 passes through a conduit liner 34 surrounded in turn by a casing 36. The liner 34 extends to the left beyond the end of the casing 36 through a rigid walled curved passageway in a movable guide member 40, which member can be given a linear shift as indicated by a double-headed arrow 42. The lefthand end of the liner 34 as shown in the figure extends into a casing member 46, the liner being free to slide along its own axis within the casing 46 as well as within the casing 36 during motion of the member 40. The wire 26 continues toward the left after leaving the liner 34, passing next through a guide member 48, and thence through the contact shoe 24 to the neighborhood of the workpiece 22. The member 40 may be moved by means of the relay winding 21 in the welding circuit together with a linkage indicated schematically by a broken line 50.

I find it advisable to use a lower feed speed of the welding wire during the approach of the electrode tip to the workpiece before the arc is struck as compared to the feed speed used during the time the arc is in use. For example, with a wire feed speed of 600 inches per minute during welding I prefer to use an approach speed of about 300 inches per minute. I use the starting up of the current in the welding circuit to operate means to increase the wire feed speed as well as to actuate means to retract the wire for starting the arc.

The reduced wire feed speed at start-up is advantageous for various reasons. It enables the retraction of the wire at contact to take place at a known uniform wire feed speed which is independent of the particular wire feed speed used during welding, thus producing a more consistent arc starting operation. It also helps to prevent the possibility of buckling of the wire upon initial contact with the work.

Speed control means for controlling the speed of the feed roll drive means are shown schematically in FIGURE 1 in block form at 33. The wire feed speed may be changed simultaneously with the displacement of the movable guide member 40 by action of the relay winding 21 together with a second linkage indicated schematically by a broken line 51.

In the operation of the system of FIGURE 1, to start a welding operation, the wire is pushed through the liner 34, the guide member 48 and the contact shoe 24 at relatively low speed to touch the workpiece 22, thus drawing a suitably large current from the source 20 through the contact thus formed. The relay winding 21 is immediately actuated and through the linkage 50 shifts the member 40 to the right as viewed in the figure and through the linkage 51 brings the wire feed up to full speed. Provided the wire 26 is sufficiently stiff for the purpose, the motion of the member 40, if made sufficiently swift, retracts the tip of the wire 26 away from the workpiece 22, thus providing a proper starting condition for striking the desired arc, consistent with the fact that the wire 26 is being continuously propelled in the direction of the arc. The actual retraction necessary is relatively small, for example three-sixteenths of an inch. There is sufficient play of the liner in the casing 36 and/or of the wire in the space 37 between the righthand end of the liner and the rolls 30, 32, to take up the length of wire that is backed up by the motion of the member 40. Meanwhile the tip of the wire 26 burns in the arc at a linear rate that increases as the tip approaches closer to the workpiece, tending more or less automatically to maintain a constant length of the electric arc. To supplement this action, any known form of automatic control of the arc length by means of voltage variations in the arc may be employed.

FIGURE 2 shows a preferred form of the retracting member 40 as it can be conveniently and advantageously mounted upon a hand held welding gun of the pistol grip type. The wire 26 is shown with its tip protruding from a contact shoe 52 within the nozzle 54 of the gun. The barrel of the gun is shown generally at 56, the pistol grip handle at 60, and a control trigger at 62. Water for cooling the gun may be supplied through a conduit 64, the water returning through a combined electric power and water outlet conduit 66. Shielding gas may be supplied to the gun through a conduit 68, and an electric cable for control purposes may be extended into the gun through a conduit 70.

The wire 26 comes from the drive rolls through the casing 36 and liner 34 as in FIG. 1, and thence through the retracting member 40, the barrel 56 of the gun, and the contact shoe 52. The liner 34 is shown pressed against a constriction 72 in the gun where the passageway narrows and the wire 26 continues on to the left beyond the end of the liner as shown.

As the motor element for the retracting member 40, I prefer to use a rotary solenoid, a type of which is available on the market from G. H. Leland, Inc., of Dayton, Ohio, under the designation of Ledex Rotary Solenoid.

Referring to FIGURES 2 and 3, the rotary solenoid is shown in exterior appearance at 74 and is mounted in a protective casing 76. The external moving member of the rotary solenoid 74 is a circular rotary platform 78 to which I attach a circular base plate 80. Upon the plate 80, I preferably mount a circular bearing plate 82. Also upon the base plate 80 I mount three pins 84, 86, 88, each extending through a separate hole in the bearing plate 82. The pin 84 serves as an anchorage for one end of an extension spring 90, the other end of which spring is secured to a post 93 mounted on the casing 76. The pin 88 serves as a pivot for a retracting plate 92 which suitably is circular and of smaller diameter than the bearing plate 82. The pin 86 is arranged to slide in a slot 94 when the retractor plate 92 is rotated about the pin 88 as a pivot. The retractor plate 92 has a curved recess or groove 96 which accommodates the liner 34, the latter being clamped in this groove by clamp member 98 which is secured as by screws 100.

In the arrangement shown in FIG. 2, the wire 26 comes into the retracting member 40 at an angle of 30 degrees to the axis of the barrel of the welding gun. However, other angles of approach may be used. I have found that 30 degrees is sufficient to obtain the desired grip on the welding wire in the curved groove in the retractor plate 92, and does not result in undue bending of the wire as it is fed through the groove.

When the rotary solenoid is actuated, the base plate 80 and bearing plate 82 are rotated together about their common center through an angle of 25 degrees in the counterclockwise direction, which angle I find preferable in this embodiment, although other angles of rotation may be used in this or other embodiments. During the rotation of the plates 80 and 82, the stiffness of the wire 26 in the liner 34 causes the retractor plate 92 to rotate in the clockwise direction in opposition to the motion of the plates 80 and 82. The two rotations can be made to cancel each other out, leaving substantially a linear movement of the clamped liner in its own plane. In the embodiment shown, I prefer to incline the line determined by the pins 84, 86, 88 at an angle of 70 degrees to the barrel axis, which brings it into an inclination of 80 degrees with respect to the axis of the incoming wire. These angles, however are not critical and depend upon the geometrical configuration of the cooperating parts in any given embodiment.

While the usual solenoid on the market is provided with its own restoring spring so that the solenoid is operated against the force of the spring by means of electric current impressed upon the solenoid, and upon cessation of the electric current the moving member of the solenoid is returned by the spring to its initial position, it may be desirable to supplement this spring by another. For this purpose, the spring 90 shown in FIGURE 2 is provided.

After the welding arc has been established by touching the wire 26 to the workpiece 22 and retracting the wire by means of the action of the solenoid, the solenoid may be allowed to relax and return to the unretracted position. This occurs naturally when a discharge from a condensor is employed to actuate the solenoid, in which case the solenoid relaxes when the discharge is over. The relaxation of the solenoid will result in a forward thrust of the wire 26 toward the workpiece 22. The arc will rapidly consume the electrode tip as it approaches the workpiece during this forward motion. As there is very little actual resultant reduction of the arc length and as the time period during which the wire advance is accelerated is very short, there is no material disturbance to the welding operation occasioned by the sudden advancement of the liner 34 when the solenoid relaxes. If desired, the solenoid may be maintained in the actuated position throughout the welding operation after the electrode wire has been retracted and the arc is established.

It will be evident that the use of a liner 34 is not required as far as the operation of retracting the wire 26 is concerned, since the wire may be made to substantially fill the curved groove in the retractor plate 92, so that when the retractor plate is moved in its plane the wire is moved with the retractor plate. In this case, the clamping plate 98 or equivalent is to be used merely to confine the wire within the groove and not to grip the wire. Preferably the liner is used to protect the wire against the adverse effects of friction betwen the wire and the surfaces of the groove. Since the wire moves freely in the liner, the liner if it is sufficiently rigid can be clamped in fixed position relatively to the retractor plate.

FIGURE 4 shows the normal and retracted positions of the retractor plate 92 and of the liner 34 in relation to the adjacent casings 36 and 46, on an enlarged scale. In this figure, the line through the pins 86 and 88 is shown in the vertical direction and the axes of the casings 36 and 46 are oriented so that the angle between the vertical and the axis of casing 36 is 70 degrees, and the angle between the vertical and the axis of casing 46 is 80 degrees. The normal or unretracted position of the parts is shown in full line and the retracted position in broken line.

The casing 36 is shown having a conical opening 102 from which the liner 34 emerges. The liner 34 then extends through the curved groove in the retractor plate 92 and into a conical opening 104 in the casing 46. In the unretracted position, the liner terminates at 106 where it abuts against a conical restriction 108.

To retract the liner 34, the bearing plate 82 is rotated through an angle, illustrated here as 25 degrees in the counterclockwise direction, shifting the pin 88 to the new position 88' and the pin 86 to the new position 86'. The pin 86 is guided by the slot 94 so that the retractor plate 92 is rotated in the clockwise direction by the effect of the stiffness of the wire 26 in the liner 34. The slot 94 is so dimensioned that the rotation of the plate 92 is approximately 25 degrees, thereby offsetting the rotation of the plate 82 and effecting a substantially straight line resultant motion of the plate 92 to the retracted position 92' with the slot 94 in the new position 94'. The desired amount of displacement of the plate 92 may be determined by fixing the length of the slot 94, the pin 86 pressing against the lefthand end of the slot 94 in the unretracted position and against the righthand end of the slot in the retracted position as viewed in FIG. 4. The lefthand end of the liner 34 in the retracted position is shown in broken line at 110.

Using the embodiment illustrated herein, I have found that the wire electrode can be retracted three-sixteenths of an inch and the arc satisfactorily established within a period of fifteen milliseconds from the instant that the wire electrode first touches the workpiece. The shortness of this time interval contributes greatly to the uniformity of successive welds, by shortening the transition period between start and steady state operation. The interval of fifteen milliseconds was observed when using a wire feed speed of approximately 600 inches per minute. At this speed, the wire is pushed forward 0.15 inch in 15 milliseconds. If the liner is retracted 3/16 inch (0.1875) during this period, the net retraction is 0.0375 inch. During this time, however, the electrode wire is burning back rapidly, so that the actual spacing between the wire tip and the workpiece at the end of the 15 milliseconds is considerably greater than 0.0375 inch, and has been found to be approximately 3/16 inch.

In the embodiment illustrated herein, the electrode wire used was an aluminum wire of 1/16 inch diameter and the liner 34 was a nylon tube of wall thickness 1/32 inch. The wire storage drum and wire feed rolls were located about six feet away from the welding gun. There was room in the casing 36 for the liner to slide toward the feed rolls when the liner was retracted and to accommodate an extra 3/16 inch of wire between the moving member 40 and the feed rolls.

It is contemplated that the nozzle of the hand held welding gun will be electrically insulated so that the nozzle can be held against the workpiece throughout the welding thus contributing to the uniformity of successive welds.

As examples of variations which may be made in the dimensions of the embodiment of the invention shown herein, there may be cited the angle of entry of the liner 34 into the moving element 40 with reference to the axis of the gun barrel, the rotary stroke of the rotary solenoid, the radius of curvature of the groove in the element 40, and the distance the electrode tip is pulled away from the workpiece. Depending upon the stiffness of the wire 26, the angle of entry may be varied over a range from one degree to ninety degrees and the radius of curvature may be varied from a quarter inch to ten inches or more. The distance that the electrode tip is retracted may vary from 0.001 inch to 0.750 inch. The stroke of the rotary solenoid may be varied within limits of one degree and one hundred and eighty degrees. A linearly moving solenoid may be used in place of the rotary type if desired.

It will be evident that the exact course of the wire electrode from the storage reel to the arc location is not critical, it being sufficient that at some point along the course of the wire the guide member is so shaped, as for example by having a bend, curve or loop, or the like, that movement of the guide member substantially in the direction of the course of the wire imparts substantially identical accelerations to the wire and guide member, these two accelerating substantially as a unit without causing material relative motion of wire and guide member, the wire being sufficiently stiff to be moved by movement of the guide member and sufficiently flexible to be pushed through the guide member by the wire feed means past the point where the guide member is so shaped.

The invention is applicable not only to welding guns which are hand held but also to welding guns or welding heads which are mounted on fixtures and used for automatic or semi-automatic welding. Also, the wire feed rolls and wire storage drum may be mounted in or upon the welding head instead of at a distance.

While illustrative forms of apparatus and methods in accordance with the invention have been described and shown herein, it will be understood that numerous changes may be made without departing from the general principles and scope of the invention.

I claim:

1. Apparauts for striking an arc between the arc supporting terminals of cooperating electrodes, one of which electrodes is a flexible wire continuously fed toward the other electrode, a movable guide member for said wire, said guide member being so shaped at some point along the course of the wire that movement of the said guide member substantially in the direction of the course of the wire imparts substantially identical accelerations to the wire and guide member, these two accelerating substantially as a unit without causing material relative motion of wire and guide member, said wire being sufficiently stiff to be moved by movement of said guide member and sufficiently flexible to be pushed through said guide member past said point where the guide member is so shaped, and means responsive to the touching together of said cooperating electrodes for moving the said guide member in the direction to move the wire away from the arc to retract the wire from the other electrode at a speed sufficient to more than offset the forward motion of the wire, thereby separating the said touching electrodes to strike an arc therebetween.

2. Apparatus for striking an arc between the arc supporting terminals of cooperating electrodes, one of which electrodes is a flexible wire continuously fed toward the other electrode, a movable guide member for the wire, said guide member defining in a plane a curved path for the wire in said guide member, said guide member permitting sliding motion of the wire therethrough, said guide member being movable in the plane of said curved path, said wire being sufficiently stiff to be moved by movement of said guide member and sufficiently flexible to be pushed through said guide member along said curved path, and means responsive to the touching together of said cooperating electrodes for moving said guide member in said plane in the direction to move the wire away from the arc location to retract the wire from the other electrode at a speed sufficient to more than offset the forward motion of the wire, thereby separating the said touching electrodes to strike an arc therebetween.

3. Apparatus according to claim 2, in which the said means for moving said guide member is a rotary solenoid.

4. Apparatus according to claim 2, in which the said means for moving said guide member is a rotary solenoid having its rotary member connected to said guide member through a mechanical linkage whereby the rotary motion of the said rotary member is converted to a substantially linear motion of said guide member in the plane of said curved path.

5. Apparatus according to claim 4, in which the said movable guide member is a grooved plate pivotally mounted upon said rotary member of the solenoid, said plate having a guiding slot therein, and said rotary member of the solenoid having a pin fixed thereto, said pin extending through said guide slot, whereby the pivotal motion of the said grooved plate is guided and limited by said slot to effect the conversion of the rotary motion of the rotary member of the solenoid to the substantially linear motion of said grooved plate.

6. Apparatus according to claim 5, together with means to retain the wire slidably confined within the groove in said grooved plate.

7. Apparatus according to claim 5, together with a covering member in which the wire is slidably confined, and means for clamping said covering member within the groove in said grooved plate while permitting sliding motion of the wire within said covering member.

8. Apparatus according to claim 1, together with additional means responsive to the touching together of said cooperating electrodes for increasing the feed speed of the said flexible wire toward the other electrode.

9. Apparatus for striking an arc between the arc supporting terminals of cooperating electrodes, one of which electrodes is a flexible wire continuously fed toward the other electrode, comprising, in combination, tubular means enclosing said wire in slidable relationship therewith, means defining a curved portion in said tubular means, the said curved portion of the said tubular means being movable in a direction generally toward and away from the arc, said wire being sufficiently stiff to be moved by movement of said curved portion of said tubular means and sufficiently flexible to be pushed through said tubular means through said curved portion, and means responsive to the touching together of said cooperating electrodes for moving said curved portion of said tubular means in the direction to move the wire away from the arc to retract the wire from the other electrode at a speed sufficient to more than offset the forward motion of the wire, thereby separating the said touching electrodes to strike an arc therebetween.

10. Apparatus according to claim 9, together with means to control the wire feed speed, and in which the said means responsive to the touching together of the cooperating electrodes is further utilized for actuating said speed control means to increase the wire feed speed.

11. Apparatus for striking an arc between the arc supporting terminals of cooperating electrodes, one of which electrodes is a flexible wire continuously fed toward the other electrode, comprising, in combination, hollow guide means for guiding said wire, lining means for said hollow guide means, said lining means enclosing said wire in sliding relationship therewith, said hollow guide means including a portion defining in a plane a curved passageway through which passes said lining means, means to secure said lining means within said curved passageway, the said portion of guide means defining said curved passageway being movable substantially parallel to its own axis, whereby said lining means moves substantially as a unit with said portion of guide means defining said curved passageway, said wire being sufficiently stiff to be moved by said movement of said movable portion of said guide means and sufficiently flexible to be pushed through said lining member along said curved path, and means responsive to the touching together of said cooperating electrodes for moving said movable portion of said guide means in the direction to retract the wire from the other electrode at a speed sufficient to more than offset the forward motion of the wire, thereby separating the said touching electrodes to strike an arc therebetween.

12. Apparatus according to claim 11, together with means to control the wire feed speed, and in which the means responsive to the touching together of the cocoperating electrodes is further utilized for actuating said speed control means to increase the wire feed speed.

References Cited

UNITED STATES PATENTS

| | | | |
|---|---|---|---|
| 2,817,003 | 12/1957 | Dusek | 219—130 |
| 3,227,852 | 1/1966 | Fullerton et al. | 219—130 |

BERNARD A. GILHEANY, *Primary Examiner.*

R. N. ENVALL, Jr., *Assistant Examiner.*